United States Patent [19] [11] Patent Number: 5,394,329
Bridgens [45] Date of Patent: Feb. 28, 1995

[54] METHOD OF AND APPARATUS FOR ESTIMATING SURFACE FRICTION

[75] Inventor: Barry J. Bridgens, West Midlands, England

[73] Assignee: Lucas Industries public limited company, Solihull, England

[21] Appl. No.: 53,590

[22] Filed: Apr. 27, 1993

[30] Foreign Application Priority Data

Apr. 28, 1992 [GB] United Kingdom ............... 9209137

[51] Int. Cl.⁶ .................... B60K 31/00; B60T 8/32
[52] U.S. Cl. .................... 364/426.01; 364/426.03; 180/197; 303/113.2; 73/9
[58] Field of Search ............ 364/426.01, 426.03, 364/426.02; 180/197; 303/95, 97, 109, 113.2; 73/9, 529, 534

[56] References Cited

U.S. PATENT DOCUMENTS

| 4,665,490 | 5/1987 | Masaki et al. | 364/426 |
| 4,936,636 | 6/1990 | Matsuda | 303/103 |
| 4,947,332 | 8/1990 | Ghoneim | 364/426.03 |
| 5,090,511 | 2/1992 | Kabasin | 180/197 |
| 5,123,715 | 6/1992 | Okubo | 303/108 |
| 5,132,906 | 7/1992 | Sol et al. | 364/426.02 |
| 5,216,608 | 6/1993 | Ito et al. | 364/426.03 |
| 5,263,548 | 11/1993 | Tsuyama et al. | 180/197 |
| 5,269,390 | 12/1993 | Glover et al. | 180/197 |
| 5,328,006 | 7/1994 | Tsuyama et al. | 180/197 |
| 5,330,027 | 7/1994 | Glover | 364/426.03 |

Primary Examiner—Kevin J. Teska
Assistant Examiner—Tan Nguyen
Attorney, Agent, or Firm—Jenner & Block

[57] ABSTRACT

Measurements of wheel speed are compared to detect excessive wheel spin. An output of the wheel spin detector is supplied to a drive reducing device for reducing vehicle drive engine output in response to detection of excessive wheel spin. The reduced vehicle drive engine output is compared with a predetermined value by a subtracter. An estimate of surface friction is updated with a value dependent upon the output of the subtracter.

5 Claims, 2 Drawing Sheets

METHOD OF AND APPARATUS FOR ESTIMATING SURFACE FRICTION

FIELD OF THE INVENTION

The present invention relates to a method of and an apparatus for estimating friction of a surface, for instance for use in a wheeled vehicle having a traction control system.

BACKGROUND OF THE INVENTION

When the driven wheels of a wheeled vehicle spin with respect to the surface over which the vehicle is travelling, lateral instability or loss of directional control of the vehicle may result. The driven wheels may spin when excessive torque is applied to the wheels, for instance during rapid acceleration of the vehicle, or when the vehicle passes over a surface having a relatively low coefficient of friction, for instance ice, mud, snow and gravel.

Traction control systems are known which detect excessive wheel spin and which reduce the drive supplied to the driven wheels to stop the driven wheels from spinning excessively, thereby allowing control of the vehicle to be maintained.

The performance of a traction control system is generally a compromise. For low friction surfaces, the traction control system should have a low entry threshold, that is the amount of wheel spin that is acceptable before the traction control system operates to reduce the drive supplied to the driven wheels. For high friction surfaces, a higher entry threshold is preferable so as to provide improved acceleration performance of the vehicle.

SUMMARY OF THE INVENTION

According to a first aspect of the invention, there is provided a method of estimating surface friction during operation of a vehicle, comprising detecting excessive wheel spin, reducing vehicle drive, comparing the reduced vehicle drive with a predetermined value, and updating a surface friction estimate in accordance with the result of the comparison.

According to a second aspect of the invention, there is provided an apparatus for re-estimating surface friction during operation of a vehicle, comprising detecting means for detecting excessive wheel spin, drive reducing means for reducing vehicle drive in response to detection of excessive wheel spin by the detecting means, comparing means for comparing the reduced vehicle drive with a predetermined value, and updating means for updating a surface friction estimate in accordance with the result of the comparison by the comparing means.

Preferably the comparing means forms the difference between the reduced vehicle drive and the predetermined value, and the updating means adds to the surface friction estimate a value corresponding to the difference, for instance proportional thereto. Averaging means may be provided for periodically averaging the reduced vehicle drive, with the comparing means comparing the averaged reduced vehicle drive with the predetermined value.

Preferably the updating means periodically updates the surface friction estimate for as long as the drive reducing means reduces vehicle drive.

The surface friction estimating apparatus may be embodied within a vehicle traction control system which itself may be embodied within an engine management system. Where such a traction control or engine management system is embodied as a programmed data processor system, surface friction estimation may be included by augmenting the controlling software so that little or no additional hardware or hardware modification is required.

The surface friction estimate may be used to improve or enhance vehicle operation. For instance, the surface friction estimate may be used to influence one or more control parameters of a traction control system and/or an antilock brake system. In the case of a traction control system, the surface friction estimate may be used to influence a traction control entry threshold, for instance as disclosed in copending European Patent Application No. 92311639.6.

BRIEF DESCRIPTION OF THE DRAWINGS

The present invention will further be described, by way of example, with reference to the accompanying drawings, in which.

DESCRIPTION OF THE PREFERRED EMBODIMENTS

Figure 1:
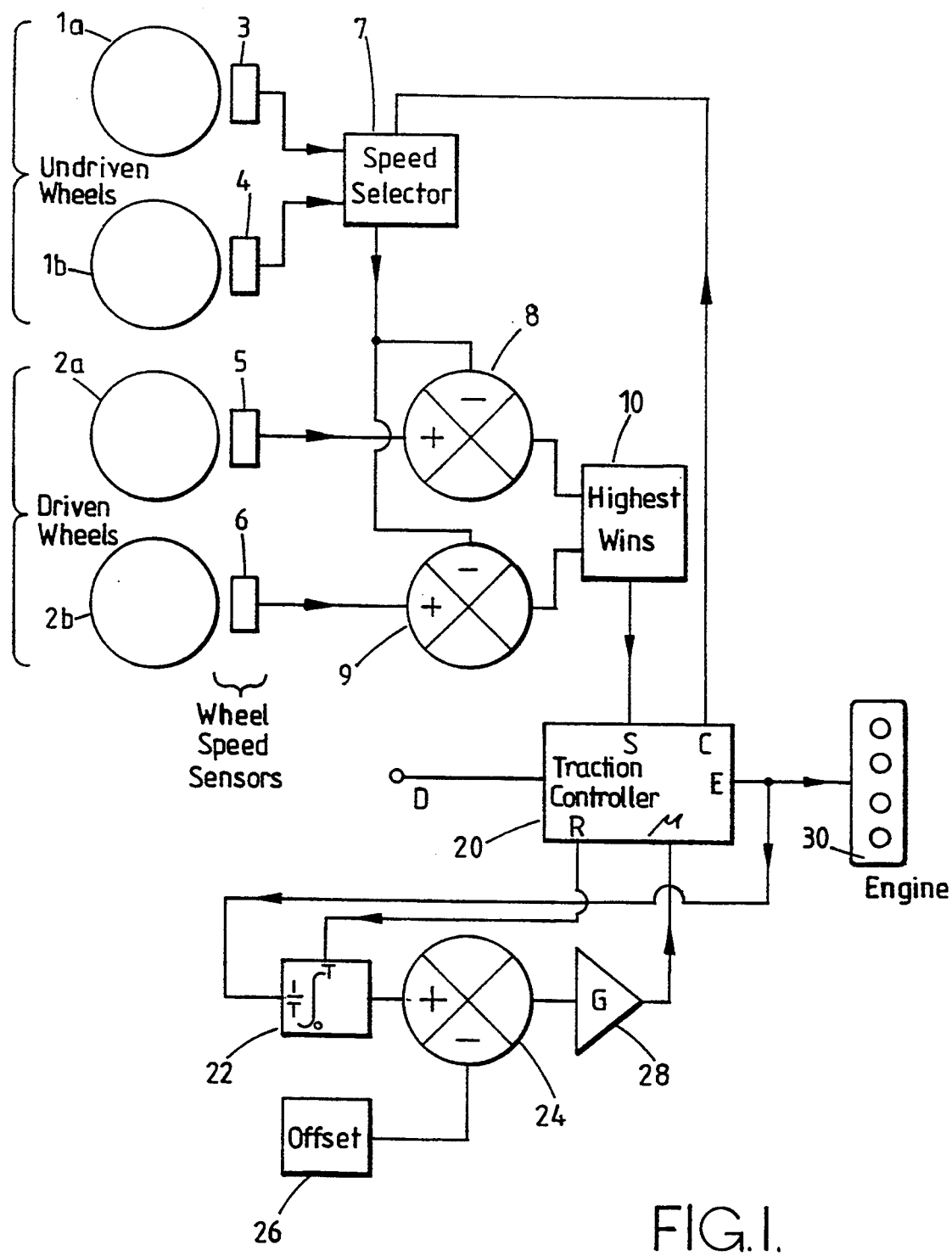
FIG. 1 is a schematic diagram of an apparatus for estimating surface friction constituting an embodiment of the present invention.

Referring to FIG. 1, a vehicle has first and second undriven wheels $1a$ and $1b$ on a first axle and first and second driven wheels $2a$ and $2b$ on a second axle. Sensors 3 to 6 are provided to measure the speeds of the wheels $1a$, $1b$, $2a$, $2b$, respectively. The sensors 3 and 4 have outputs connected to first and second inputs of a reference speed selector 7. The output of the reference speed selector 7 is connected to a subtracting input of a first subtracter 8 and to a subtracting input of a second subtracter 9.

The output of the sensor 5 of the first driven wheel $2a$ is connected to an adding input of the first subtracter 8. The output of the sensor 6 of the second driven wheel $2b$ is connected to an adding input of the second subtracter 9. The output of the first subtracter 8 is connected to a first input of a "highest wins" circuit 10. The output of the second subtracter is connected to a second input of the "highest wins" circuit 10. The output of the "highest wins" circuit 10 is connected to a spin input S of a traction controller 20.

The traction controller 20 receives a driver demand input D, for instance from an accelerator pedal sensor, and has an engine output demand output E for controlling the output of an engine 30. An input of an averager 22 is connected to the engine output demand output of the traction controller. A reset output R of the traction controller is connected to a reset input of the averager 22. The output of the averager is connected to an adding input of a third subtracter 24. The offset generator 26 has an output connected to a subtracting input of the third subtracter 24. The output of the third subtracter 24 is connected to the input of an amplifier 28. An output of the amplifier 28 is connected to a third input $\mu$ of the traction controller 20. A control output C of the traction controller is connected to a control input of the reference speed selector 7.

The speeds of the undriven wheels 1a and 1b are measured by the sensors 3 and 4 and supplied to the reference speed selector 7. The reference speed selector sets the reference speed to be the speed of the slowest undriven wheel or the speed of the fastest undriven wheel under the control of the traction controller 20. The reference speed is provided to the subtracting inputs of the first and second subtracters 8 and 9 where the reference speed is subtracted from the speeds of the respective driven wheels 2a and 2b so as to measure the respective amounts of spin of the driven wheels. The measurements of wheel spin of the driven wheels are supplied to the "highest wins" circuit. The "highest wins" circuit supplies the signal corresponding to the larger amount of wheel spin to the spin input S of the traction controller 20.

The traction controller 20 sets the engine output demand equal to the driver demand input when the amount of wheel spin is below an entry threshold. When the amount of wheel spin exceeds the entry threshold, the traction controller reduces the engine output demand in accordance with a predetermined control strategy to reduce the wheel spin to acceptable levels. During the time when the traction controller 20 is performing traction control, the reset signal is removed from the averager 22. The averager 22 forms an average of the engine output demand over a plurality of consecutive predetermined periods during traction control. An offset is subtracted from each average engine output demand and the result is multiplied by a constant by the amplifier 28. The output of the amplifier represents a modifying value. The modifying value is supplied to the third input $\mu$ of the traction controller 20.

The modifying value is added to a variable SURFACE at the end of each predetermined period in which the traction controller is performing traction control. The variable SURFACE holds an estimate of the surface friction of the surface over which the vehicle is travelling and is stored by the traction controller. The averager 22 is reset at the end of each predetermined period. Further averaging of the engine demand and updating of the variable, SURFACE, are performed while the traction controller 20 continues to perform traction control. The predetermined period is typically of the order of 1 second.

The value of the offset may be determined by testing the performance of a test vehicle of the same type on a plurality of differing surfaces. Once a suitable value for the offset has been identified, it may be permanently set for that type of vehicle.

The surface friction estimating apparatus can conveniently be embodied by a programmed data processor. Thus, the traction controller 20, the averager 22, the third subtracter 24, the offset generator 26 and the amplifier 28 may all be embodied as a programmed data processor. The value of the offset and the gain used for each vehicle, or each type of vehicle, is stored in read only memory.

The time spent performing traction control and the amount to which the engine output demand is controlled is used as a measure of the surface friction. When the vehicle is driving over a low friction surface, the traction controller limits the engine output demand to relatively small values. However when the vehicle passes over a surface with a 1a larger coefficient of friction, the traction controller is generally not required to make large reductions in the engine output demand and consequently the engine output demand may take relatively large values.

The average value of the engine output demand is used to calculate the modifier as follows:

modifier=(average value−offset) * gain.

The modifier can have a positive or a negative value depending on whether the average value of the engine output demand is greater or less than the offset. The modifier is added to the variable, SURFACE. Thus the value of SURFACE can either increase or decrease depending upon the level to which the traction controller controls the engine output demand. The rate of change of the value of SURFACE is also dependent upon the value of the gain used. Greater gains result is increased rates of change for SURFACE, but the gain is limited by other considerations, such as stability. Thus driving on a low friction surface will cause SURFACE to tend towards a relatively low value, whilst driving on a high friction surface will cause SURFACE to tend towards a relatively high value.

The value of SURFACE is constrained to lie within upper and lower boundaries.

Parameters of the traction controller, such as the entry threshold can be made dependent upon the value of SURFACE. Thus, it is possible to tune the response of the traction controller, for instance by making the entry threshold proportional to the value of SURFACE.

The estimate of the surface friction represented by the variable SURFACE is stored in non-volatile memory. Thus, the most recent estimate of friction remains available even if the vehicle ignition has been switched off.

The value of surface is used to control the operation of the reference speed selector 7. In a specific application of the friction estimating apparatus to a specific vehicle, the value of SURFACE is constrained to lie between 0 and 30000. A very slippy surface is represented by low values of SURFACE close to 0, whereas a high grip surface is represented by values close to 30000. The reference speed selector 7 is arranged to select the lower undriven wheel speed as the reference speed when the value of SURFACE is less than 10000. The highest undriven wheel speed is used as the reference speed when SURFACE is greater than or equal to 10000. The offset value is set to 300 where the engine output demand is constrained to values between 0 representing zero driver demand and 1023 representing maximum driver demand. A value of 64 is selected for the gain.

Figure 2:
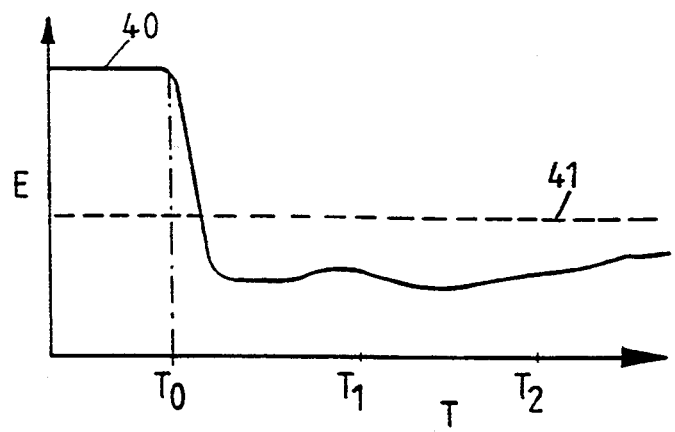
FIG. 2 is a graph representing engine output demand when spin occurs.

FIG. 2 shows a graph of engine output demand E plotted along the abscissa against time T plotted along the ordinate for a vehicle fitted with the traction controller and friction estimating apparatus of FIG. 1. A continuous line 40 represents the engine output demand whereas a broken line 41 represents the value of the offset. At time $T_0$, the vehicle moves on to a low friction surface and excessive wheel spin is detected. The traction controller 20 intervenes reducing the engine output demand 40 so as to tend to reduce the wheel spin to an acceptable target value. The averager 22 receives and averages the engine output demand E for the period $T_0$ to $T_1$. At time $T_1$, the offset is subtracted from the average of the engine output demand by the subtracter 24. The result is then multiplied by the gain of the amplifier 28 to form the modifier, which is added in the controller 20 to the variable SURFACE so as to update the estimate of the surface friction. The averager 22 is reset and then averages the engine output demand for the period $T_1$ to $T_2$. The updating as described above is repeated at the end of each period during which the traction controller 20 reduces the engine output demand. Typically the averaging is performed for successive periods of 1 second.

Figure 3:
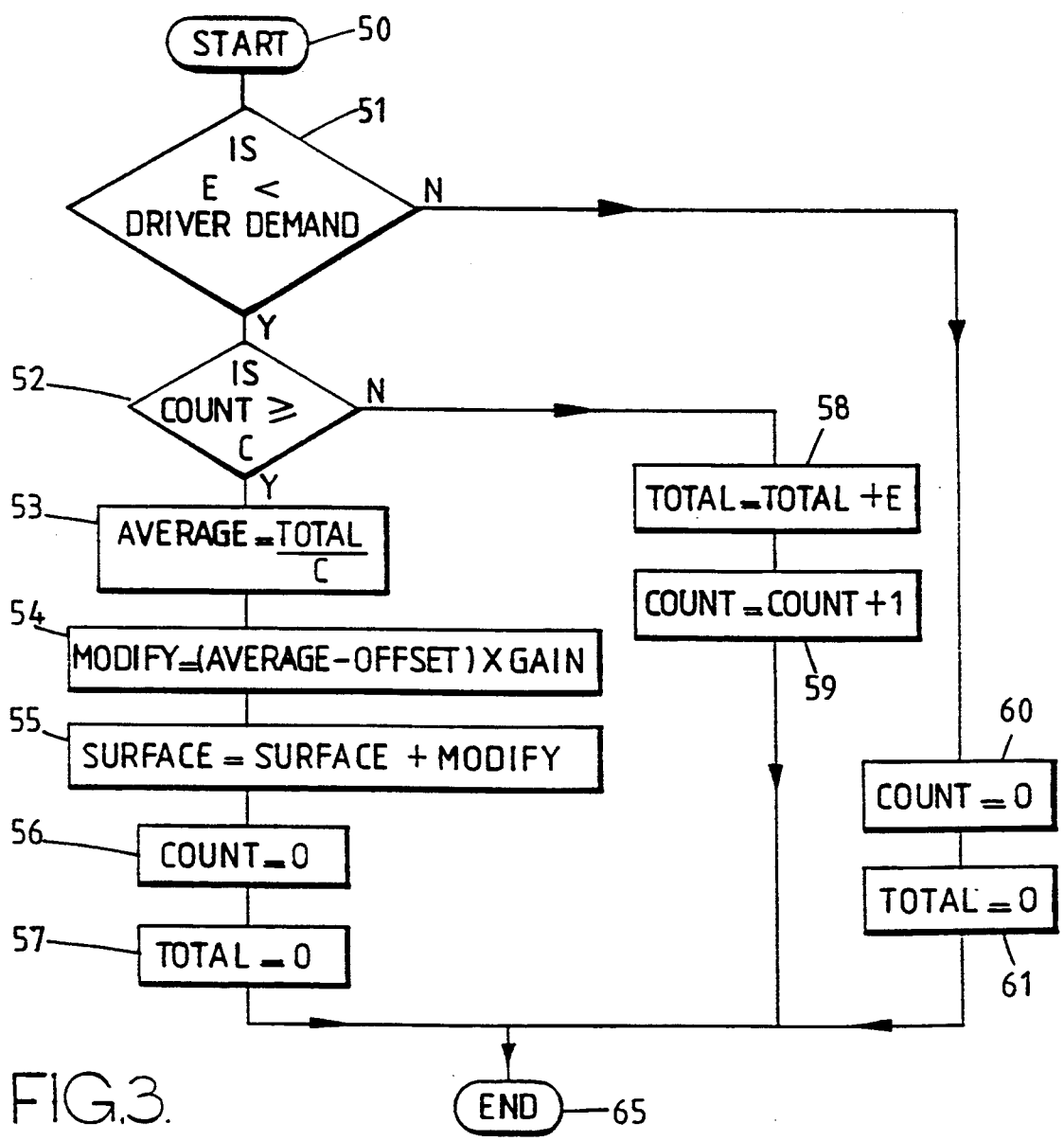
FIG. 3 is a flow diagram illustrating operation of the apparatus of FIG. 1.

FIG. 3 is a flow diagram for a routine for estimating surface friction. The routine is suitable for inclusion into a traction controller embodied by a programmable data processor. The routine starts at step 50 in response to an interrupt request. The engine output demand E is compared with the driver demand at step 51 to determine if the traction controller has intervened to reduce the engine output power. Control is passed to step 52 if the engine output demand E is less than the driver demand, or to step 60 if the engine output demand in not less than the driver demand. A variable COUNT which stores the number of times that the routine has been executed is compared with a constant C at step 52. If COUNT is greater than or equal to C control is passed to step 53. Control is passed to step 58 if COUNT is less than C.

The variables COUNT and C control the period of time over which the average of the engine output demand is formed. For example, if the average is to be taken over intervals of 1 second duration and the routine is executed at intervals of 10 mS, then the value of C would be set to 100.

The engine output demand is added to a variable TOTAL at step 58. Control is then passed to step 59 where COUNT is incremented. The routine is then exited at step 65.

At the end of each averaging interval when COUNT=C, TOTAL is divided by C at step 53 to form an average of the engine output demand. The value of MODIFY is calculated at step 54 by subtracting an offset from the average of the engine output demand and then multiplying the result by a constant, GAIN. Control is then passed to step 55 where the variable SURFACE is updated by the addition MODIFY. The variables COUNT and TOTAL are then reset to zero at steps 56 and 57. The routine is exited at step 65.

At the end of traction control, the variable COUNT is reset to zero at step 60. Control is then passed to step 61 where the variable TOTAL is reset to zero. The routine is then exited at step 65.

As before, SURFACE is constrained to lie between upper and lower limits. Such constraining steps are not shown but may be associated with the step 55. The variable SURFACE is stored in non-volatile memory so as to maintain an estimate of surface friction even when the vehicle ignition is switched off.

It is thus possible to provide an estimate of surface friction. The estimate is updated during periods of intervention by a traction controller. If the properties of the surface should change, such as driving from one surface to another or snow melting while a vehicle is parked, then the estimate of surface friction is rapidly updated during traction control intervention by the traction controller.

I claim:

1. An apparatus for estimating surface friction during operation of a wheeled vehicle having an engine, said apparatus comprising:
   detecting means for detecting excessive wheel spin;
   drive reducing means for reducing engine output in response to detection of excessive wheel spin;
   comparing means arranged to form a difference between the reduced engine output and a predetermined value; and
   updating means for updating a surface friction estimate by adding to the surface friction estimate a value corresponding to the difference between the reduced engine output and the predetermined value.

2. An apparatus as claimed in claim 1, in which the value added to the surface friction estimate is proportional to the difference between the reduced engine output and the predetermined value.

3. An apparatus as claimed in claim 1, further comprising averaging means for periodically averaging the reduced engine output to provide an averaged reduced engine output, and wherein said comparing means is arranged to compare the average reduced engine output with the predetermined value.

4. An apparatus as claimed in claim 1, in which said updating means is arranged to periodically update the surface friction estimate as long as said drive reducing means reduces engine output.

5. A method of estimating surface friction during operation of a wheeled vehicle having an engine, comprising the steps of:
   detecting excessive wheel spin;
   reducing engine output in response to detected excessive wheel spin;
   forming a difference between the reduced engine output and a predetermined value; and
   updating a surface friction estimate by adding to the surface friction estimate a value corresponding to the difference between the reduced engine output and the predetermined value.

* * * * *